United States Patent
Rowe

(10) Patent No.: US 6,176,658 B1
(45) Date of Patent: Jan. 23, 2001

(54) SUPPORT BAR WITH TIE-DOWN POSTS, FOR PICK-UP TRUCKS AND THE LIKE

(76) Inventor: James Rowe, P.O. Box 230109, Anch, AK (US) 99523

(*) Notice: Under 35 U.S.C. 154(b), the term of this patent shall be extended for 0 days.

(21) Appl. No.: 09/231,542

(22) Filed: Jan. 14, 1999

(51) Int. Cl.[7] ............................. B61D 45/00; B65D 63/00
(52) U.S. Cl. ..................... 410/106; 410/101; 410/102; 410/110
(58) Field of Search ..................... 296/32, 36; 410/101, 410/102, 106, 108, 110, 115, 116; 248/499

(56) References Cited

U.S. PATENT DOCUMENTS

| | | | |
|---|---|---|---|
| 4,650,382 | * 3/1987 | Johnson | 410/110 |
| 4,872,719 | * 10/1989 | Cardwell | 296/34 |
| 5,364,211 | * 11/1994 | Lund | 410/108 |
| 5,445,482 | * 8/1995 | Davis | 410/115 |
| 5,476,349 | * 12/1995 | Okland | 410/106 |
| 5,642,971 | * 7/1997 | Ragsdale | 410/106 |
| 5,738,471 | * 4/1998 | Zentner et al. | 410/110 |
| 5,827,024 | * 10/1998 | Davenport | 410/110 |
| 5,904,458 | * 5/1999 | Bundy | 410/106 |

* cited by examiner

Primary Examiner—D. Glenn Dayoan
Assistant Examiner—Scott Carpenter
(74) Attorney, Agent, or Firm—Michael J. Tavella

(57) ABSTRACT

A rail for pickup truck side walls, made of structural steel, that does not need as many braces to ensure its strength. The rail is secured to the truck bed at the ends of the rail. Along the rail are posts, but these posts do not extend down to the truck bed sides. They end short of the bed sides, leaving a space. This space allows a rope to be passed under the post, thereby making the job of tying down objects much simpler. The posts are also tapered from top to bottom (narrower at the top, wider at the bottom). This allows the posts to be used as tie points, with the ability to keep the rope from slipping. Thus, these rails and posts have the benefits of the rails without the problems typically found with ordinary posts. The rails are sized for long or short bends. On longer beds, a double rail system can be used.

19 Claims, 7 Drawing Sheets

SUPPORT BAR WITH TIE-DOWN POSTS, FOR PICK-UP TRUCKS AND THE LIKE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to support bars with tie-down posts, for pick-up trucks, flatbed trailers, car toppers and the like, and particularly to support bars with tie-down posts that have open bases, for pick-up trucks.

2. Description of Related Art

Pick-up trucks have become a standard general use vehicle as compared to the strict working class vehicle that was produced years ago. As a result of this change, many commercial features have been added to them, including luxury interiors, bed liners, bed covers, and support rails. The support rails run along the length of the truck bed sides. Items can be placed on the rails and then tied, to hold them securely. To provide enough strength for the rails, support posts are placed between the ends of the rails. There may be one, two, three, or more of these posts, depending on the length of the bed. The posts are designed to be fastened to the top of the truck bed. Although this design is strong, it has one major flaw. Because the posts extend down to the top of the truck bed, a rope or other tie down means must be passed around the posts when being used a tie down. This often slows down the job and can make the task more difficult. Lacing a rope, for example, around a large object may require several passes over and around the object, as well as the rails, and the truck. In many cases, two people are needed to ensure the job gets done properly, without tangling the rope.

BRIEF SUMMARY OF THE INVENTION

The instant invention solves this problem. It uses a rail made of structural steel that does not need as many braces to ensure its strength. The rail is secured to the truck bed at the ends of the rail. Along the rail are posts, but these posts do not extend down to the truck bed sides. They end short of the bed sides, leaving a space. This space allows a rope to be passed under the post, thereby making the job of tying down objects much simpler. In the preferred embodiment, the posts are also tapered from top to bottom (narrower at the top, wider at the bottom). This allows the posts to be used as tie points, with the ability to keep the rope from slipping. However, straight bar stock can be used for the posts with some slight deterioration in performance. Thus, these rails and posts provide the benefits of the rails without the problems typically found with ordinary posts. The rails are sized for long or short beds. On longer beds, a double rail system can be used.

Because the rails do not have supports between the ends of the rails, as is done in the prior art, the rails of the instant invention must be made of stronger material than that normally used. The rails are attached to the side walls of a truck using a mounting plate. The mounting plate has a place for an eyebolt, that can be used as a tie down point as part of the overall system.

Although the system is described for pickup trucks, it can be easily adapted for flatbed trailers or car top carriers. Such changes involve only the dimensions of the rails to fit the various vehicles.

DETAILED DESCRIPTION OF THE INVENTION

Figure 1:
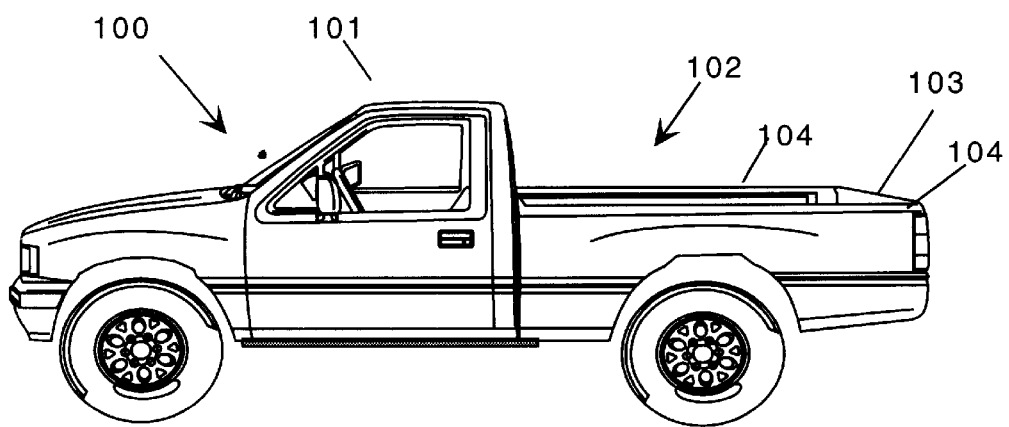
FIG. 1 is a side view of a typical pickup truck.
Figure 2:
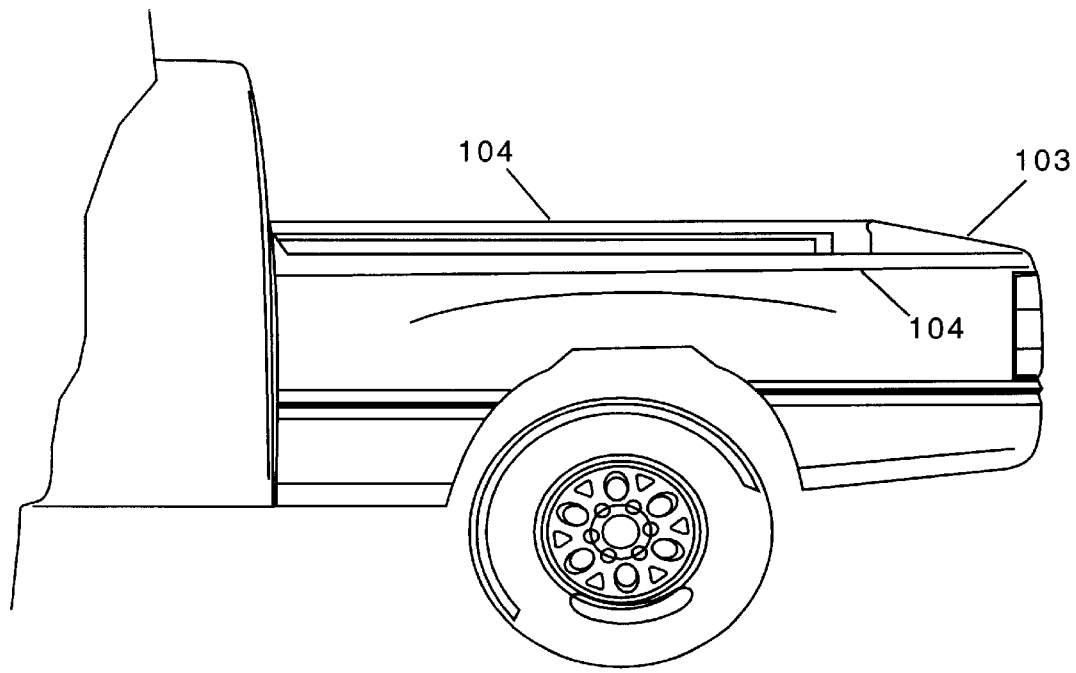
FIG. 2 is a detail view of the bed portion of a typical pickup truck, showing the side walls.

Referring now to FIG. 1, a typical pickup truck type vehicle 100 is shown. Such vehicles typically have a cab 101 and a bed 102. FIG. 2 shows a larger view of the bed portion 102 of the pickup truck. The bed, typically has a tailgate 103 and side walls 104 as shown. The instant invention is secured to the side walls as discussed below. The side walls 104 have generally flat upper surfaces that have some thickness, forming a platform on which the invention is mounted.

Figure 3:
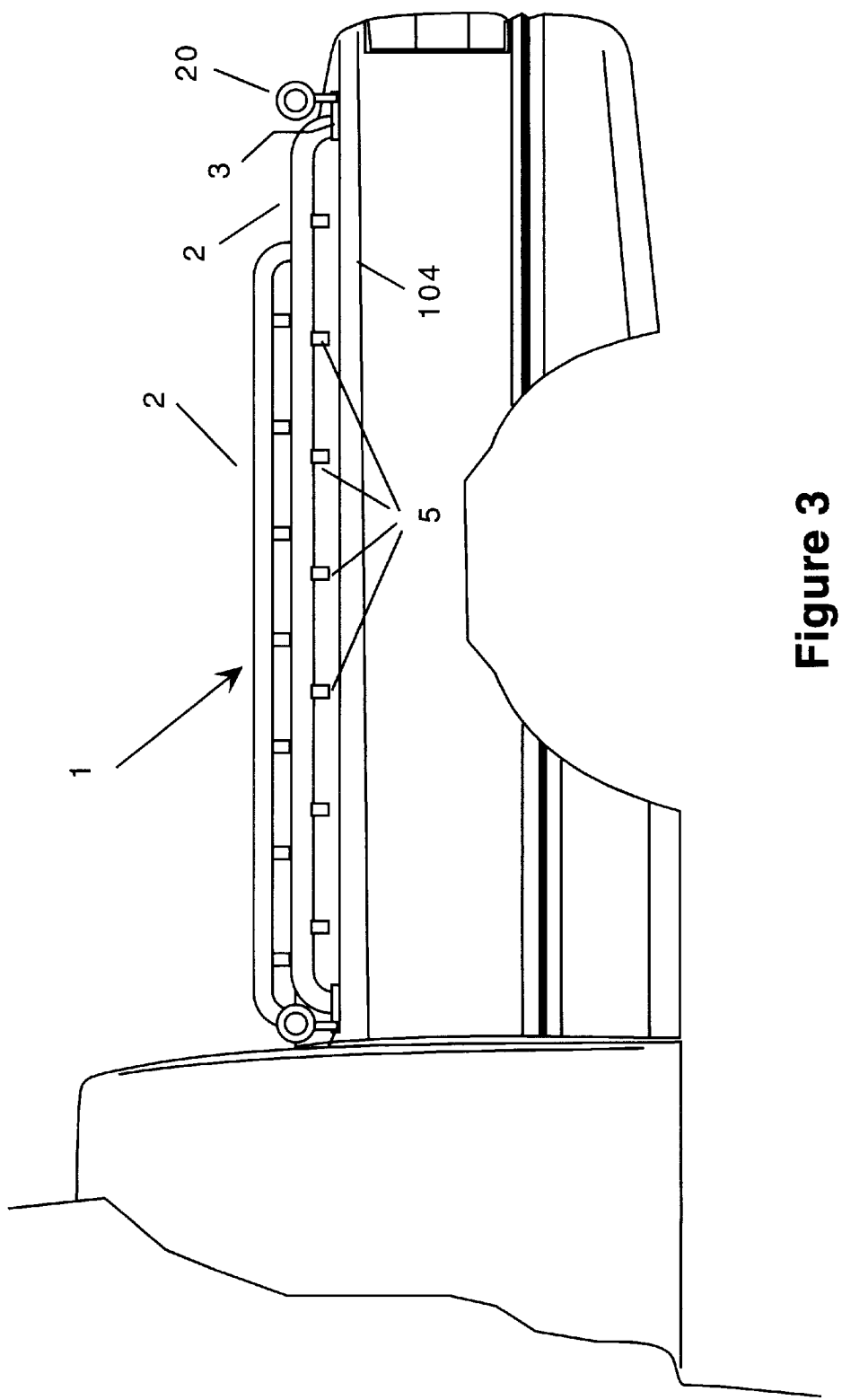
FIG. 3 is a detail view of the bed of a pickup truck showing the sidewalls with the instant invention in place.

FIG. 3 shows a pickup truck bed with the invention 1 installed. The invention 1 comprises a pair of rails 2 that are angled into mounting plates 3, as discussed below. One mounting end plate 3 is placed at each end of the rails 2 as shown. Between the mounting end plates 3, the rails 2 extend the length of the side walls 104. Along this length, a number of tie-down posts 5 are suspended. These posts 5 do not make contact with the side walls 104 of the truck. In this way, ropes and other similar equipment, can pass completely under the posts 5 for the length of the sidewall 104. These posts 5 are used to secure ropes or the like to the rails 2 so that items in the truck bed can be secured. Also, items placed on the rails 2 can also be secured in the same way. The number of tie down posts 5 varies with the length of the bed. In the preferred embodiment, for a six-foot long bed, five posts 5 are used on each rail 2. For an eight foot bed, six posts 5 are preferred. Of course, the number of posts 5 can vary from one to more than eight as desired. However, the preferred number of posts provides a convenient number of posts 5 without getting the posts too close together to be useful.

Figure 4:
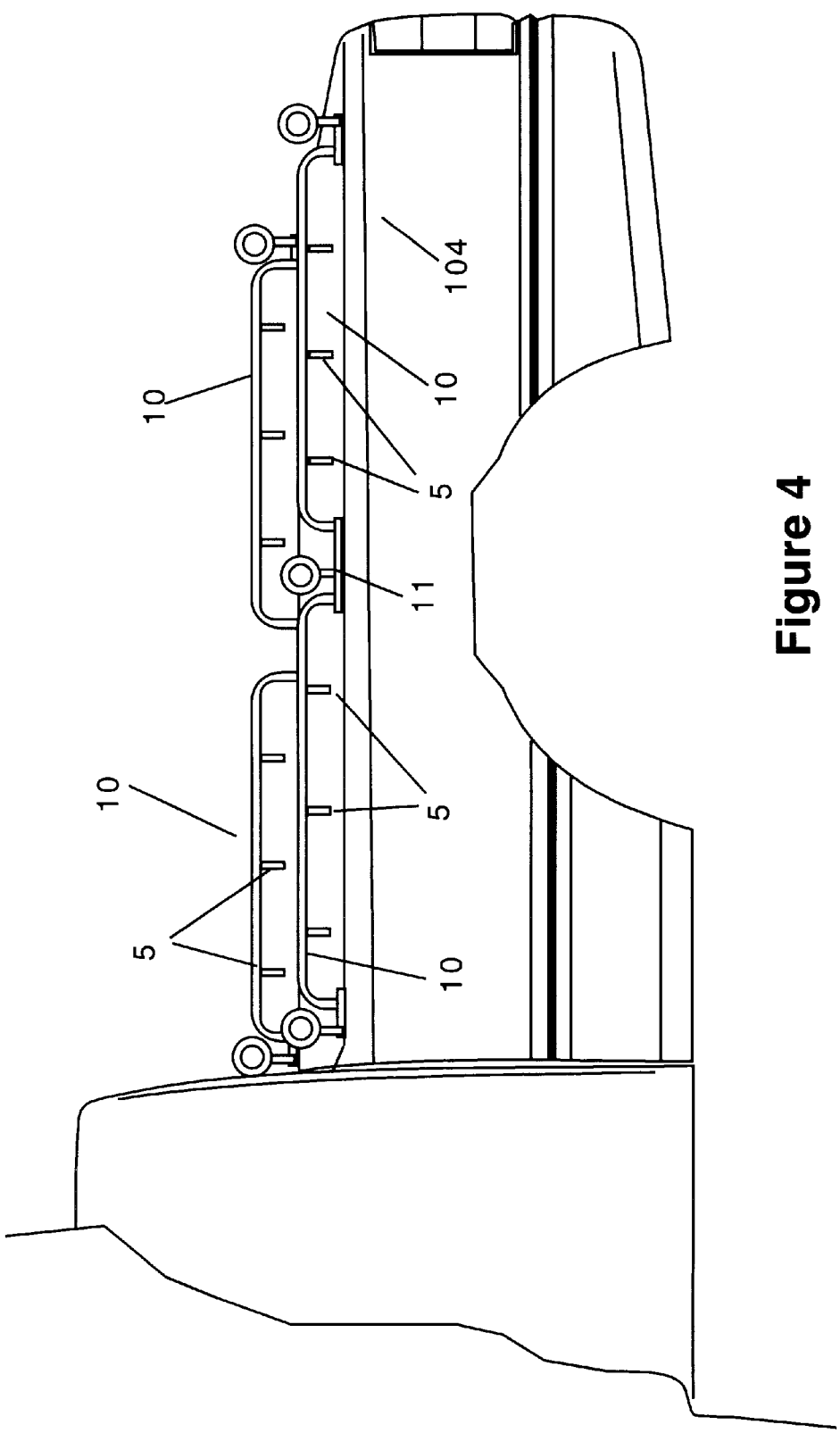
FIG. 4 is a detail view of the bed of a pickup truck showing the sidewalls with the second embodiment of the instant invention in place.
Figure 8:
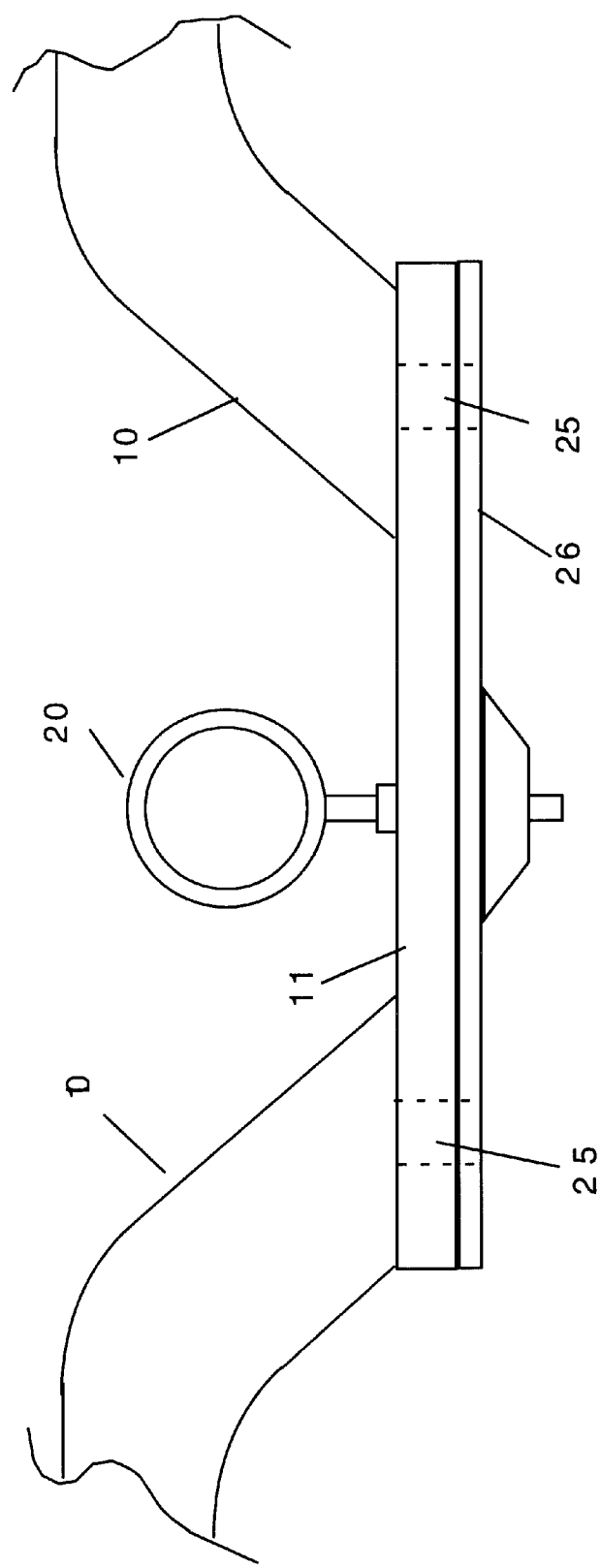
FIG. 8 is a side detail view of the center securing plate using with the second embodiment.

FIG. 4 shows a second embodiment of the invention. This embodiment is limited to eight foot beds. It comprises two half-rails 10 mounted per side wall 104, as shown. The half rails 10 are identical to the full rails 2, except for length. Each half rail 10 has three posts 5 installed as shown. The only exception in this system is a center connection plate 11 as shown in FIG. 8, which is discussed below.

Figure 5:
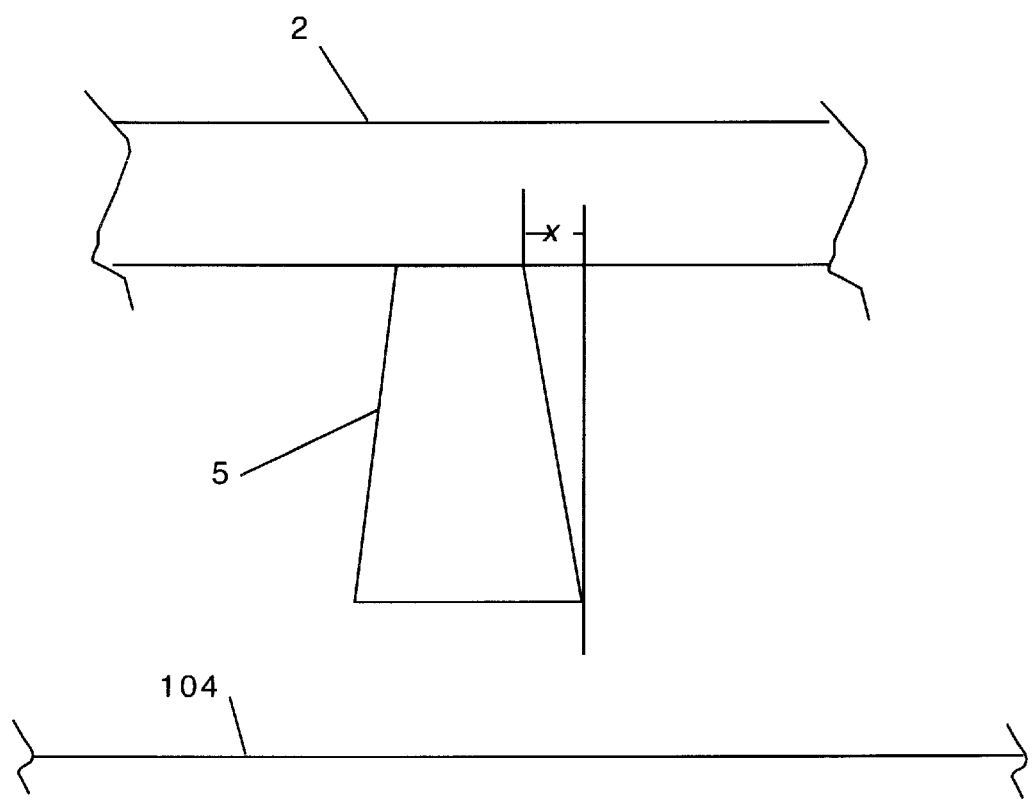
FIG. 5 is a detail side view of a fastening post of the instant invention.

FIG. 5 shows a typical tie down post 5. The post is designed to sit approximately one and one-half inch above the sidewall top, as shown. The post is also designed to be tapered as shown, forming a frusto-conical section. In the preferred embodiment, the taper (as signified by the letter x on the figure) is one-half inch. The tapering of the post 5 helps keep ropes from sliding off the post after the rope is installed. Although not preferred, the posts do not have to be tapered, they can be simple round stock, or even square or any other shape. The tapered design is preferred, however, as noted above, because of its holding capacity.

The posts 5 can be attached to the rail 2 by any number of common fastening means, such as bolts, welding or screws. It is also possible to drill receiving holes in the rails 2 for the posts 5 and then sliding the posts into the rail for welding or bolting. In the preferred embodiment, the rails 5 are attached to the sides utilizing the stake pockets provided on the vehicle.

Figure 6:
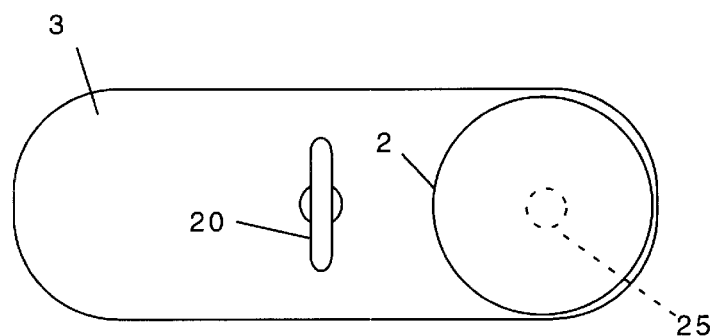
FIG. 6 is a top detail view of a securing plate for the instant invention.
Figure 7:
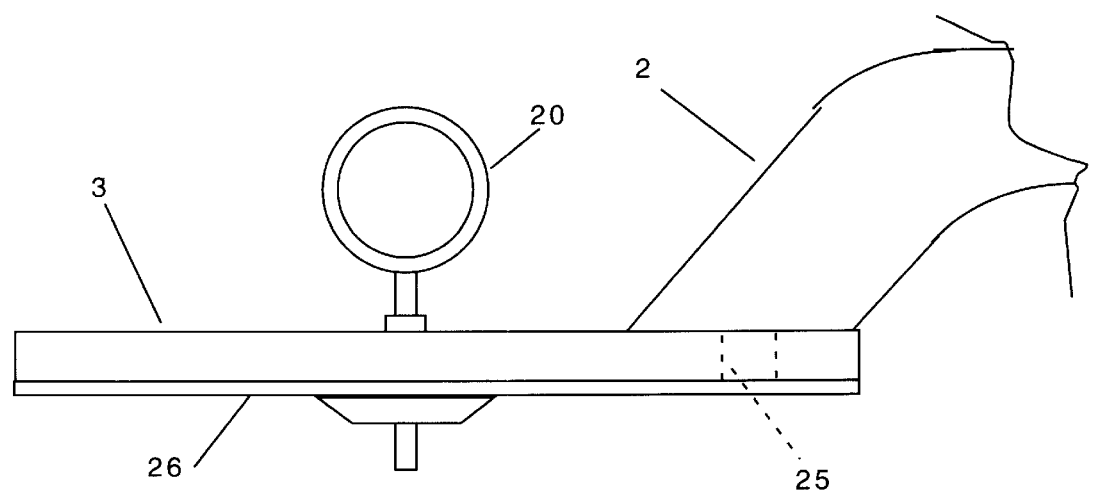
FIG. 7 is a side view of a securing plate for the instant invention.

FIGS. 6 and 7 show an end plate 3. FIG. 6 is a top view of an end plate 3. In the full length rail design, two plates 3 are used for each side wall 104. The plates are made from ¼ inch steel and are oval in shape. A fastener 20 is used to anchor the plate 3 as shown. The plate is secured within a truck stake pocket using an expansion type nut. These nuts, common to the art, typically have "wings" that expand as the bolt is tightened. The wings engage the sides of the stake pocket, locking the fastener 20, and the plate, in place. The fastener 20 can be a large screw, or a bolt. In the preferred embodiment, the fastener 20 is eyebolt is placed in the center of the plate 3 as shown. In the preferred embodiment, the eyebolt is ⅜×16×4.5 inches in size. Of course, the eyebolt can be omitted is desired, but this is not the preferred embodiment. At one end of the plate 3, the rail 2 is secured. In the preferred embodiment, the rail 2 can be welded or otherwise secured to the plate 3. FIG. 7 is a side view of the end plate 3 showing the features described above. A drain hole 25 can be drilled to allow water to drain out of the rail. When the rail is fitted onto the plate, the drain hole is within the portion covered by the rail as shown. FIG. 7 shows a gasket 26 installed under the plate. The gasket is used as a sealer in the ordinary manner as used in the art. The gasket 26 has two holes corresponding to the drain hole 25 and the hole for the fastener 20. Of course, the gasket 26 can be omitted from the device if desired.

Although the end plates 3 are preferred, they are not necessary. It is possible to attach the rails 2 directly to the side walls, if desired, using fasteners or welding techniques common to the art. The end plates 3 are preferred, however, because that have sufficient space for the eye bolts that not only secure the rails to the truck sides without welding, they also provide a convenient place to tie off ropes or other lines.

As mentioned above, the end plates 3 are used with either the first or second embodiments. However, another plate 11 is needed for the second embodiment. The center plate 11 is shown in FIG. 8. Here, the plate 11 has two rails 10 fastened as shown. In the enter of the plate an eyebolt 20 is mounted as before.

In the preferred embodiment, the rails 2 or 10 are made of schedule 10 black steel pipe. This pipe has an 835b tensile strength rating and, in the preferred embodiment, has a 1-½ inch i. d. and a 1.9 inch o. d. The preferred height of the rail at the center of the side wall is 3-½ inches (as measured from the bottom of the rail to the top of the sidewall). The length of the tie down posts 5 is two inches, thereby leaving one and one-half inches of clear space. In the preferred embodiment, the spacing of the tie down post 5 is preferably one per foot of rail length. Thus, five posts are used for a 6 to 6 ½ foot bed and 6 are used for an 8 foot bed. Of course, other high-strength material may be used in place of the steel. For example, high strength plastics or stainless steel can be used in place of the steel pipe described above.

The rails 2 can be provided with any desired finish. They can be painted flat black, or any other color. They can be chrome plated, or stainless. Plastic rails can be produced in any color desired.

Figure 9:
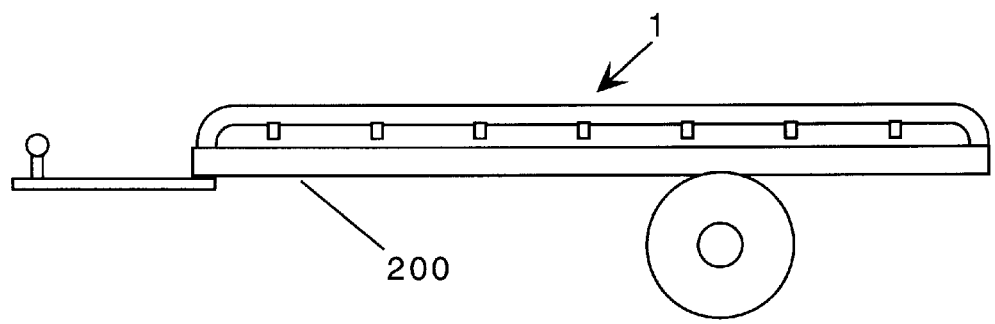
FIG. 9 is a side view of a flatbed trailer with the instant invention installed.
Figure 10:
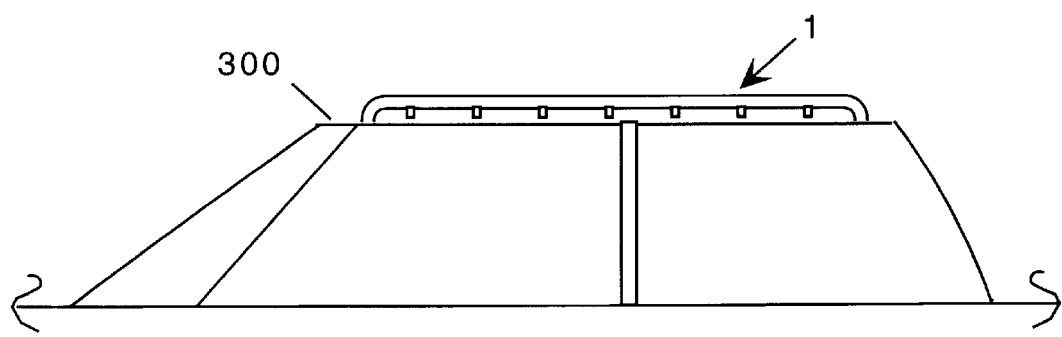
FIG. 10 is a side view of a car top showing the instant invention installed.

Finally, FIG. 9 shows the device 1 installed on a flatbed trailer 200 and FIG. 10 shows the device 1 installed on a car top 300.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A support rail for use with pickup trucks having a bed and two sidewalls comprising:
    a) a rail portion, said rail portion having a first end and a second end, whereby said first end and said second end of said rail portion being adapted to align with a pickup truck sidewall;
    b) means for attaching said rail portion to said pickup truck sidewall; and
    c) at least one post, fixedly attached to said rail portion and extending directly downward from said rail portion such that when said rail portion is attached to said pickup truck sidewall, said post is suspended above said pickup truck sidewall, in the same vertical plane as said rail portion, without touching said pickup truck sidewall, thereby forming a gap between said post and said pickup truck sidewall.

2. The support rail of claim 1 wherein the rail portion has a plurality of posts attached thereto, each of said posts being suspended above said pickup truck sidewall without touch said pickup truck sidewall, thereby forming a gap between said post and said pickup truck sidewall.

3. The support rail of claim 2 wherein each post forms a frusto-conical section, having a base and a top and wherein the base is wider than the top.

4. The support rail of claim 1 wherein the means for means for attaching said rail portion comprise:
    a) a plate, having a means for receiving said rail portion; and
    b) a means for fastening said plate to said pickup truck sidewall.

5. The support rail of claim 4 further comprising an eyebolt, attached to said plate.

6. The support rail of claim 4 wherein the means for fastening said plate to said pickup truck sidewall comprise an eyebolt, removably attached to said plate.

7. A support rail for use with pickup trucks having a bed and two sidewalls comprising:
    a) a first rail portion, said first rail portion having a first end and a second end, whereby said first end and said second end of said first rail portion being adapted to align with a pickup truck sidewall, and further such that said first rail portion having a length that is substantially less than the length of said pickup truck sidewall;

b) a second rail portion, said second rail portion having a first end and a second end, whereby said first end and said second end of said second rail portion being adapted to align with a pickup truck sidewall, and further such that said second rail portion having a length that is substantially less than the length of said pickup truck sidewall;

c) a means for attaching said first rail portion to said pickup truck sidewall;

d) a means for attaching said second rail portion to said pickup truck sidewall;

e) at least one post, fixedly attached to said first rail portion and extending directly downward from said first rail portion such that when said first rail portion is attached to said pickup truck sidewall, said post is suspended above said pickup truck sidewall, in the same vertical plane as said rail portion, without touching said pickup truck sidewall, thereby forming a gap between said post and said pickup truck sidewall; and f) at least one post, fixedly attached to said second rail portion and extending directly downward from said second rail portion such that when said second rail portion is attached to said pickup truck sidewall, said post is suspended above said pickup truck sidewall, in the same vertical plane as said rail portion, without touching said pickup truck sidewall, thereby forming a gap between said post and said pickup truck sidewall.

8. The support rail of claim 7 wherein the means for securing said first rail portion and the means for securing said second rail portion to said pickup truck sidewall comprise:

a) a first plate, fixedly attached to said first end of said first rail portion, said first plate having means for attaching said first plate to said pickup truck sidewall;

b) a second plate, fixedly attached to said second end of said second rail portion, said second plate having means for attaching said second plate to said pickup truck sidewall; and c) a center plate, fixedly attached to the second end of said first rail portion and to the first end of said second rail portion, said center plate having means for attaching said center plate to said pickup truck sidewall.

9. The support rail of claim 8 wherein the means for attaching said first plate, to said pickup truck sidewall comprises an eye bolt, removably installed in said first plate.

10. The support rail of claim 8 wherein the means for attaching said second plate, to said pickup truck sidewall comprises an eye bolt, removably installed in said second plate.

11. The support rail of claim 8 wherein the means for attaching said center plate, to said pickup truck sidewall comprises an eye bolt, removably installed in said center plate.

12. A support rail for use with vehicles having a flat mounting surface comprising:

a) a rail portion, said rail portion having a first end and a second end, whereby said first end and said second end of said rail portion being adapted to align with a flat mounting surface;

b) means for attaching said rail portion to said flat mounting surface; and c) at least one post, fixedly attached to said rail portion and extending directly downward from said rail portion such that when said rail portion is attached to said flat mounting surface, said post is suspended above said flat mounting surface, in the same vertical plane as said rail portion, without touching said flat mounting surface, thereby forming a gap between said post and said flat mounting surface.

13. The support rail of claim 12 wherein said flat mounting surface comprises a flat bed trailer.

14. The support rail of claim 12 wherein said flat mounting surface comprises a car top.

15. The support rail of claim 12 wherein the rail portion has a plurality of posts attached thereto, each of said posts being suspended above said flat mounting surface without touching said flat mounting surface, thereby forming a gap between said post and said flat surface.

16. The support rail of claim 15 wherein each post forms a frusto-conical section, having a base and a top and wherein the base is wider than the top.

17. The support rail of claim 12 wherein the means for means for attaching said rail portion comprise:

a) a plate, having a means for receiving said rail portion; and b) a means for fastening said plate to said flat mounting surface.

18. The support rail of claim 17 further comprising an eyebolt, attached to said plate.

19. The support rail of claim 17 wherein the means for fastening said plate to said flat mounting surface comprise an eyebolt, removably attached to said plate.

* * * * *